United States Patent [19]

Watson

[11] Patent Number: 5,160,813
[45] Date of Patent: Nov. 3, 1992

[54] CORDLESS DIGITIZER LOCAL CONDUCTOR PHASE REFERENCE SYSTEM

[75] Inventor: James S. Watson, Phoenix, Ariz.
[73] Assignee: Calcomp Inc., Anaheim, Calif.
[21] Appl. No.: 767,112
[22] Filed: Sep. 27, 1991
[51] Int. Cl.[5] .............................................. G08C 21/00
[52] U.S. Cl. ...................................................... 178/19
[58] Field of Search ............................. 178/87, 18, 19; 340/706

[56] References Cited

U.S. PATENT DOCUMENTS

| | | | |
|---|---|---|---|
| 4,939,318 | 7/1990 | Watson et al. | 178/19 |
| 5,045,645 | 9/1991 | Hoendervoogt et al. | 178/19 |

*Primary Examiner*—Stafford D. Schreyer
*Attorney, Agent, or Firm*—Donald A. Streck; Wm. F. Porter, Jr.

[57] ABSTRACT

In an electro-magnetic, cordless digitizer system wherein a transducer emits an AC magnetic field which is detected by a first grid of scanned parallel first wires in a tablet to provide positional data for the transducer in a first axis of a coordinate system and which are detected by a second grid of scanned second wires in the tablet to provide positional data for the transducer in a second perpendicular axis of the coordinate system, a method and associated apparatus for obtaining a phase reference signal; to be used in a demodulator demodulating data signals from the first and second grids of scanned first and second wires. The method comprises the steps of, scanning the first wires to determine ones of the first wires close to a present location of the transducer; connecting to a one of the first wires displaced from the ones of the first wires close to a present location of the transducer a sufficient distance to provide a valid and usable voltage for use in generating a phase reference signal; and, using a voltage from the one of the first wires to generate a phase reference signal to the demodulator when processing data signals from both the first grid of scanned parallel wires and the second grid of scanned wires.

8 Claims, 2 Drawing Sheets

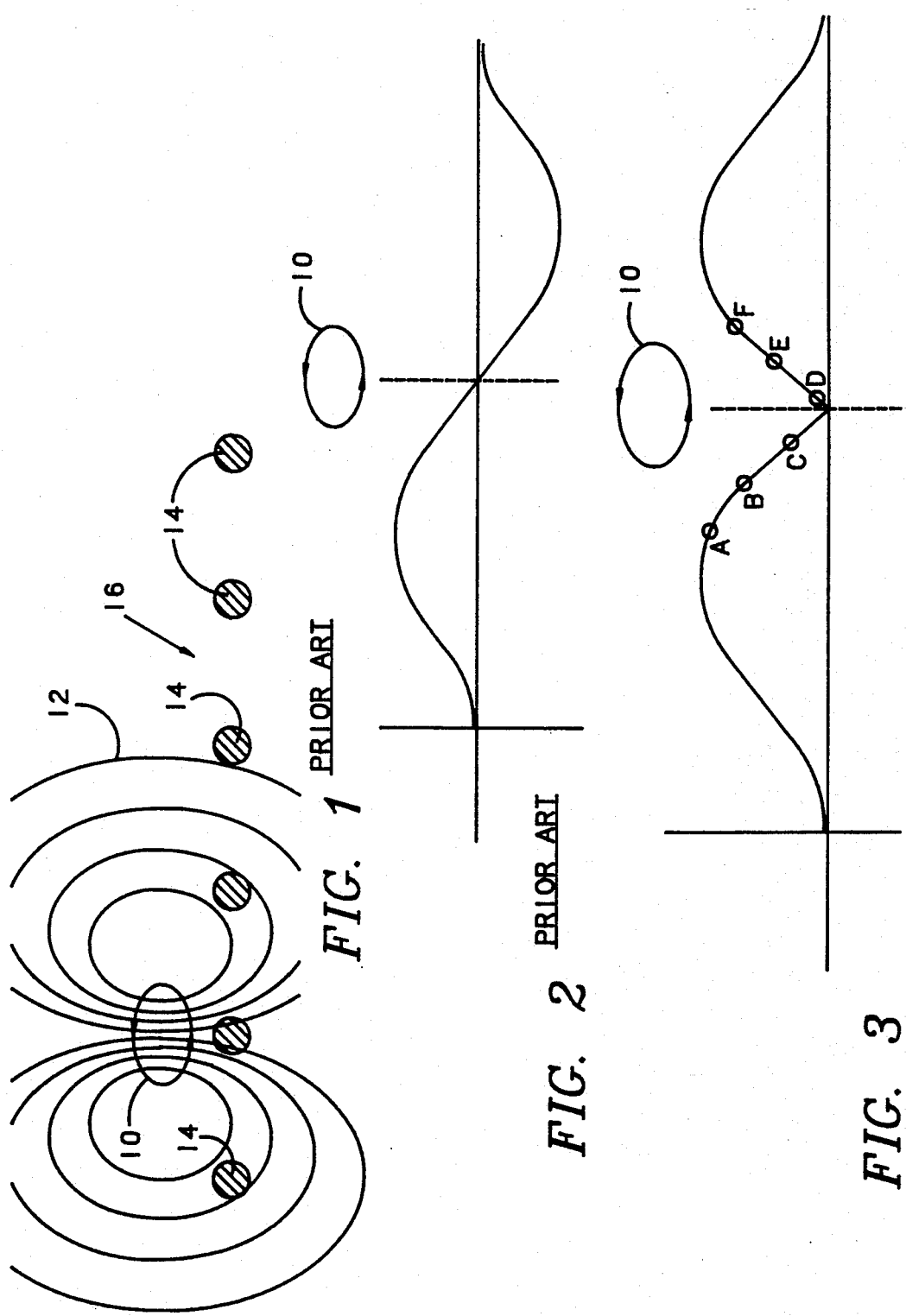

CORDLESS DIGITIZER LOCAL CONDUCTOR PHASE REFERENCE SYSTEM

BACKGROUND OF THE INVENTION

This invention relates to cordless digitizer systems and, in particular, in an electro-magnetic, cordless digitizer system wherein a transducer emits an AC magnetic field which is detected by a first grid of scanned parallel first wires in a tablet, to the improvement for obtaining a phase reference signal to be used in a demodulator demodulating data signals from the first grid of scanned parallel first wires comprising, a first multiplexer connected to the first grid of scanned parallel first wires for connecting individual ones of the first wires to an output thereof, the output of the first multiplexer being connected to provide data signals therefrom; a second multiplexer connected to the first grid of scanned parallel first wires for connecting individual ones of the first wires to an output thereof, the output of the second multiplexer being connected to provide a phase reference signal to the demodulator; and, logic means connected to the first multiplexer and the second multiplexer for first scanning the first wires to determine ones of the first wires close to a present location of the transducer and for then using the second multiplexer to connect a one of the first wires displaced from the ones of the first wires close to a present location of the transducer a sufficient distance to provide a valid and usable voltage for use in generating a phase reference signal to the demodulator.

In a digitizer system, a cursor is moved over the surface of a tablet by a user to effect data input. In many digitizer systems, the cursor is physically connected to the tablet by a connecting cable. This allows the position determination logic associated with the tablet to know what is happening at both the cursor and tablet and makes the job of positional determination much easier. In an electro-magnetic digitizer system with a driven coil, an AC electrical signal is connected to a coil in the cursor through the cable. The signal causes the coil to emit a changing magnetic field that induces signals into the wires of a grid system in the tablet. The wires of the grid system are sequentially and alternatively scanned in the X and Y directions of an X-Y coordinate system associated with the tablet. The size of the signal in the respective wires of the X and Y grids changes with proximity to the position of the cursor (i.e. the coil). Most important, the phase of the signal changes from one side of the coil to the other since the magnetic field from the coil cuts the wires in opposite directions from one side of the coil to the other. Using this data knowledge, the positional logic can then use interpolation techniques well known in the art to find the point where the signal passes through zero (i.e. changes phase) and, thereby, the exact position of the cursor.

Elimination of the cord between the cursor and the tablet can provide many benefits to a user in the way of convenience of use. This is particularly true in large tablet systems where the cord can become long and cumbersome. Thus, more recently, cordless digitizer systems have been made available commercially. In a cordless digitizer system, there are many technical advantages to employing an electro-magnetic approach such as that described above for a cord-connected system. Because very low signal levels are employed in digitizer systems in general, they are susceptible to outside interference from various sources of radiation that can be present in the environment of use such as cathode ray tube displays, and the like. An electro-magnetic system allows the designer and builder to maximize the valid data from the signal of interest while minimizing the effects of undesired interference such as electrostatic fields.

In a cordless digitizer system as developed by the assignee of this application, a battery operated circuit within the cordless cursor outputs bursts of a square wave drive signal which causes an oscillating circuit response output in and from the transducer coil also located within the cordless cursor. As the circuit including the transducer coil begins to oscillate, the initial induced response is so low that the detecting circuitry and logic in the tablet are unable to detect and determine the phase of the signal. As a consequence, a third, seven-wire loop has been disposed in the tablet in combination with the two X and Y grid loops from which to obtain a phase reference signal. While the extra looping does provide the required phase reference signal, it also adds to the manufacturing costs and complexity of the digitizer. Additionally, flexible cordless looping digitizers will not work if an aluminum shield is employed as in other digitizers and system errors can occur due to added resistance and the capacitance of the phase reference loop.

As mentioned above, in a typical corded electro-magnetic digitizing system, a grid of wires is disposed for each of the two axes, i.e. one grid for the X-axis and one grid for the Y-axis. The grids are alternately scanned to sense and determine the X and Y positions, respectively, of the cursor. The coil 10 within the cursor is activated by an alternating current so as to develop a magnetic field 12 as depicted in FIG. 1. The wires 14 of the grid 16 thereby have a voltage induced therein which is sensed and employed to determine the exact position of the coil employing interpolative techniques well known to those skilled in the art. The typical output wave form of an entire grid scan appears as in FIG. 2 wherein as the electromagnetic field 12 moves from one side of a wire 14 to the opposite side of the wire 14, the polarity of the signal changes according to well known characteristics of such induced voltages. The exact position of the coil 10 is, therefore, where the signal passes through zero or changes phase.

In a cordless digitizer system, there is no electrical connection between the cursor and the tablet whereby the logic can know the phasing of the signals at the cursor and in the tablet. Since the phase of the detected signal with respect to the signal at the cursor which produced it is unknown because of this lack of common connection (i.e. the cursor signal-producing circuitry is asynchronous to the scanning in the tablet) the only data provided by the grid wires in an electro-magnetic, cordless digitizer system is the magnitude-only response depicted in FIG. 3. The determination of phase is important, however, as can be appreciated from an inspection of the magnitude-only data curve of FIG. 3. As can be seen, the data represent points on two curves meeting in the middle in a sharp notch and tailing off more slowly on their outer ends. As data are gathered, the position determination logic does not have the advantage of of the curve FIG. 3 to view so that the position of the curve relative to the data points can be seen and established. Assuming data points "A", "B", "C", "D", "E", and "F" as depicted, we can see from FIG. 3 that the cursor is located between data points C and D. With only the magnitude data to work from, however, the position determination logic would not know whether the cursor is located (i.e. the minimum or notch of the two curves is located) between data points C and D or between data points D and E. Since precision is desired and expected, this decision is critical. It is the phase information which provides the necessary indication thereof.

Wherefore, it is the object of the present invention to provide a method and apparatus for providing a phase reference in a cordless digitizer system without the need of extra phase-detecting loops in the tablet.

Other objects and benefits of the invention will become apparent from the detailed description which follows hereinafter when taken in conjunction with the drawing figures which accompany it.

SUMMARY

The foregoing object has been attained in an electromagnetic, cordless digitizer system wherein a transducer emits an AC magnetic field which is detected by a first grid of scanned parallel first wires in a tablet to provide positional data for the transducer in a first axis of a coordinate system and which are detected by a second grid of scanned second wires in the tablet to provide positional data for the transducer in a second perpendicular axis of the coordinate system, by the improvement of the present invention for obtaining a phase reference signal to be used in a demodulator demodulating data signals from the first and second grids of scanned first and second wires comprising, a first multiplexer connected to the first grid of scanned parallel first wires for connecting individual ones of the first wires to an output thereof, the output of the first multiplexer being connected to provide data signals therefrom; a second multiplexer connected to the first grid of scanned parallel first wires for connecting individual ones of the first wires to an output thereof, the output of the second multiplexer being connected to provide a phase reference signal to the demodulator; a third multiplexer connected to the second grid of scanned second wires for connecting individual ones of the second wires to an output thereof, the output of the third multiplexer being connected to provide data signals therefrom; and, logic means connected to the first multiplexer, the second multiplexer and the third multiplexer for first scanning the wires to determine ones of the first wires close to a present location of the transducer and for then using the second multiplexer to connect a one of the first wires displaced from the ones of the first wires close to a present location of the transducer a sufficient distance to provide a valid and usable voltage for use in generating a phase reference signal to the demodulator when processing data signals from both the first grid of scanned parallel first wires and the second grid of scanned second wires.

In the preferred embodiment, there is also a phase reference signal generator having the output of the second multiplexer connected as an input thereto and having an output connected to a phase reference signal input of the demodulator. Also, a microcontroller connected to a signal output of the demodulator implements logic of the logic means and there is an exclusive OR gate disposed in a connection between the output of the phase reference signal generator and the phase reference signal input of the demodulator with the output of the phase reference signal generator being connected as one input of the exclusive OR gate and another input of the exclusive OR gate being connected to the microcontroller whereby logic of the microcontroller can determine the polarity of a phase reference signal being input to the demodulator.

DESCRIPTION OF THE DRAWINGS

FIG. 1 is a simplified drawing showing the interaction between an AC-generated electromagnetic field and the wires of a tablet grid according to one prior art approach.

FIG. 2 is a graph showing the signal produced in system such as that of FIG. 1.

FIG. 3 is a drawing of the signal received in an electromagnetic, cordless digitizer system providing magnitude-only data.

DESCRIPTION OF THE PREFERRED EMBODIMENT

Figure 4:
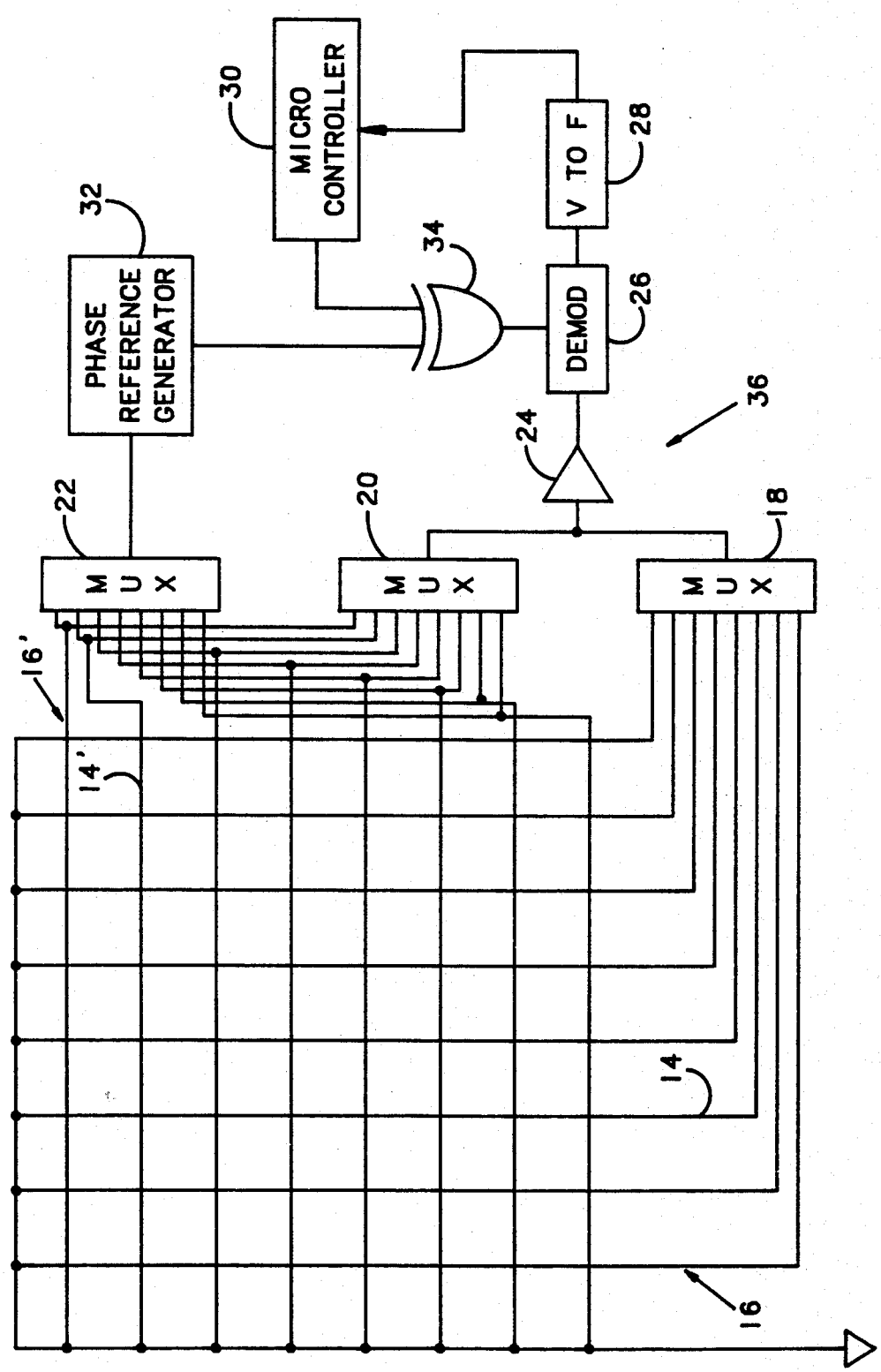
FIG. 4 is a simplified functional block diagram drawing of a tablet according to the present invention for use in a cordless digitizer system to determine the phase of the signal.

The present invention is based on the proposition that a close-adjacent wire of one of the two X and Y grids providing valid data can be employed to provide the necessary phase information. It should be noted however that to implement the present invention in the manner to be described hereinafter, the axis of the grid providing the supplemental data used for phase determination cannot be a looped axis as the wires of a looped axis need phase data for proper interpretation and, therefore, cannot be used to provide phase information. The other axis (i.e. the one not providing the phase reference signal) can be a looped wire grid if desired.

When employing the approach of the present invention, a scan is first made of all the grid wires providing the phase data in order to get a rough overview of the data across the scan as depicted in FIG. 3. The phase information is not obtained because each wire is selected as its own phase reference. The data indicates, as depicted and described above, that the cursor is located at a minimum or notch of the two curves located between data points C and D or between data points D and E. In other words, data points C and D are the lowest values of the magnitude-only data. The scan wires of interest, i.e. those associated with data points C and D are then scanned in combination with another grid wire associated with a data point several data points away and up the magnitude curve which provides the source of the phase reference signal employed in the demodulation process. This data signal is considered to be "in-phase" for purposes of subsequent signal analysis. In this example, the wire for data point A might be simultaneously scanned with the wire for data point C and then with the wire for data point D. The phasing of the reference wire, i.e. A, is compared to the phasing of the wires of interest, i.e. C and D, as part of the demodulation process. In the example depicted in FIG. 3, the phasing of the grid wire for data point C would be the same as that of the chosen reference wire for data point A while that of the grid wire for data point D would be the opposite. Thus, the decision of interest can be made that the notch or location of the cursor can be interpolatively determined as being between data points C and D.

A grid driving and signal interpretation circuit according to the present invention is shown in simplified form in FIG. 4. In the interest of simplicity and the avoidance of redundancy, those aspects of the circuitry and logic which are well known to those skilled in the digitizer art are not shown in any detail. The horizontal position of the cursor (not shown) is determined by employing the grid wires 14 of grid 16 connected to the first multiplexer 18. The vertical position of the cursor is determined by employing the grid wires 14' of grid 16' connected to the second multiplexer 20. The phase reference signal is obtained by employing the grid wires 14' of grid 16' connected to the third multiplexer 22. The outputs from the first and second multiplexers 18, 20 are connected to an operational amplifier 24 providing the input to a demodulator 26 which, in turn, provides a signal to a voltage-to-frequency converter 28 having an output connected to a micro-controller 30 performing the system control and position determination logic. The manner of operation of the demodulator 26, voltage-to-frequency converter 28, and micro-controller 30 are, in general, conventional and well-known to those skilled in the art.

The output from the third multiplexer 22 is connected to a phase reference generator 32. The output of the phase reference generator 32 is connected to one input of an exclusive OR gate 34 providing the reference signal input to the demodulator 26. The other input to the exclusive OR gate 34 comes from the micro-controller 30. As depicted and configured, the system 36 of FIG. 4 can be used to implement the method described above. The logic of the method is, of course, primarily included within the firmware executed by the microcontroller 30. Due to the nature of the characteristic data curve depicted in FIG. 3, the observing system 36 knows that the phase on one side of the coil is really 180° different from that of the other side. Thus, the system 36 can do a magnitude sweep of the array (i.e. grid) 16' of wires 14' (as described above) which will produce the characteristic data of FIG. 3. It can then arbitrarily assign the phase of the part of the sweep prior to the null as "in-phase". By selecting a wire 14' far enough from the null to have a significant voltage for use as a reference and knowing which side of the null the wire 14' is on, the logic of the system 36 knows whether to use the recovered signal normal or inverted as a reference and controls this via the microcontroller output to the exclusive OR gate 34, which can invert the phase of the reference signal.

In an alternate approach, the exclusive OR gate can be omitted. In such case, the micro-controller 30 either always selects a wire on the same side of the null or may select wires on either side and multiply recovered voltages by +1 for wires on one side and by −1 for wires on the other side.

Note that as long as the reference wire has adequate voltage, it may be used as a reference for the wires in either axis (i.e. both grid 16 and grid 16').

Although the foregoing description of the method of the present invention has been illustrated assuming sinusoidal waveforms, a system which measures magnitude and polarity of pulses emitted by the transducer is also possible employing the novel aspects of the present invention.

Wherefore, having thus described the present invention, what is claimed is:

1. In an electro-magnetic, cordless digitizer system wherein a transducer emits an AC magnetic field which is detected by a first grid of scanned parallel first wires in a tablet, the improvement for obtaining a phase reference signal to be used in a demodulator demodulating data signals from the first grid of scanned parallel first wires comprising:
   a) a first multiplexer connected to the first grid of scanned parallel first wires for connecting individual ones of said first wires to an output thereof, said output of said first multiplexer being connected to provide data signals therefrom;
   b) a second multiplexer connected to the first grid of scanned parallel first wires for connecting individual ones of said first wires to an output thereof, said output of said second multiplexer being connected to provide a phase reference signal to the demodulator; and,
   c) logic means connected to said first multiplexer and said second multiplexer for first scanning said first wires to determine ones of said first wires close to a present location of the transducer and for then using said second multiplexer to connect a one of said first wires displaced from said ones of said first wires close to a present location of the transducer a sufficient distance to provide a valid and usable voltage for use in generating a phase reference signal to the demodulator.

2. The improvement to an electro-magnetic, cordless digitizer system of claim 1 and additionally comprising:
   a phase reference signal generator having said output of said second multiplexer connected as an input thereto and having an output connected to a phase reference signal input of the demodulator.

3. The improvement to an electro-magnetic, cordless digitizer system of claim 2 wherein a microcontroller connected to a signal output of the demodulator implements logic of said logic means and additionally comprising:
   an exclusive OR gate disposed in a connection between said output of said phase reference signal generator and said phase reference signal input of the demodulator with said output of said phase reference signal generator being connected as one input of said exclusive OR gate and another input of said exclusive OR gate being connected to said microcontroller whereby logic of said microcontroller can determine the polarity of a phase reference signal being input to the demodulator.

4. The improvement to an electro-magnetic, cordless digitizer system of claim 1 and additionally comprising:
   a) a second grid of scanned second wires in the tablet oriented perpendicular to the first grid of scanned parallel first wires for providing positional information in a second axis of a coordinate system of the tablet; and,
   b) a third multiplexer connected to the second grid of scanned second wires for connecting individual ones of said second wires to an output thereof, said output of said third multiplexer being connected to provide data signals therefrom; wherein,
   c) said logic means is further connected to said third multiplexer and includes logic for employing said second multiplexer to connect a one of said first wires of said first grid of scanned parallel first wires displaced from a present location of the transducer a sufficient distance to provide a valid and usable voltage for use in generating a phase reference signal to the demodulator when processing data signals from said second grid of scanned second wires.

5. In an electro-magnetic, cordless digitizer system wherein a transducer emits an AC magnetic field which is detected by a first grid of scanned parallel first wires in a tablet to provide positional data for the transducer in a first axis of a coordinate system and which are detected by a second grid of scanned second wires in the tablet to provide positional data for the transducer in a second perpendicular axis of the coordinate system, the improvement for obtaining a phase reference signal to be used in a demodulator demodulating data signals from the first and second grids of scanned first and second wires comprising:

a) a first multiplexer connected to the first grid of scanned parallel first wires for connecting individual ones of said first wires to an output thereof, said output of said first multiplexer being connected to provide data signals therefrom;

b) a second multiplexer connected to the first grid of scanned parallel first wires for connecting individual ones of said first wires to an output thereof, said output of said second multiplexer being connected to provide a phase reference signal to the demodulator;

c) a third multiplexer connected to the second grid of scanned second wires for connecting individual ones of said second wires to an output thereof, said output of said third multiplexer being connected to provide data signals therefrom; and, d) logic means connected to said first multiplexer, said second multiplexer and said third multiplexer for first scanning said wires to determine ones of said first wires close to a present location of the transducer and for then using said second multiplexer to connect a one of said first wires displaced from said ones of said first wires close to a present location of the transducer a sufficient distance to provide a valid and usable voltage for use in generating a phase reference signal to the demodulator when processing data signals from both said first grid of scanned parallel first wires and said second grid of scanned second wires.

6. The improvement to an electro-magnetic, cordless digitizer system of claim 5 and additionally comprising:

a phase reference signal generator having said output of said second multiplexer connected as an input thereto and having an output connected to a phase reference signal input of the demodulator.

7. The improvement to an electro-magnetic, cordless digitizer system of claim 6 wherein a microcontroller connected to a signal output of the demodulator implements logic of said logic means and additionally comprising:

an exclusive OR gate disposed in a connection between said output of said phase reference signal generator and said phase reference signal input of the demodulator with said output of said phase reference signal generator being connected as one input of said exclusive OR gate and another input of said exclusive OR gate being connected to said microcontroller whereby logic of said microcontroller can determine the polarity of a phase reference signal being input to the demodulator.

8. In an electro-magnetic, cordless digitizer system wherein a transducer emits an AC magnetic field which is detected by a first grid of scanned parallel first wires in a tablet to provide positional data for the transducer in a first axis of a coordinate system and which are detected by a second grid of scanned second wires in the tablet to provide positional data for the transducer in a second perpendicular axis of the coordinate system, a method of operation for obtaining a phase reference signal to be used in a demodulator demodulating data signals from the first and second grids of scanned first and second wires comprising the steps of:

a) scanning the first wires to determine ones of the first wires close to a present location of the transducer;

b) connecting to a one of the first wires displaced from the ones of the first wires close to a present location of the transducer a sufficient distance to provide a valid and usable voltage for use in generating a phase reference signal; and, c) using a voltage from the one of the first wires to generate a phase reference signal to the demodulator when processing data signals from both the first grid of scanned parallel wires and the second grid of scanned wires.

* * * * *